(12) United States Patent
Utley et al.

(10) Patent No.: US 10,253,707 B2
(45) Date of Patent: Apr. 9, 2019

(54) REDUNDANCY IN UAV ENGINE TIMING POSITION SYSTEMS

(71) Applicant: ORBITAL AUSTRALIA PTY LTD, Balcatta, Western Australia (AU)

(72) Inventors: Tyron Dean Utley, Cloverdale (AU); Nicolass Harry Buters, Maylands (AU); Jayesh Narayan, Nedlands (AU)

(73) Assignee: ORBITAL AUSTRALIA PTY LTD, Balcatta (AU)

( * ) Notice: Subject to any disclaimer, the term of this patent is extended or adjusted under 35 U.S.C. 154(b) by 0 days.

(21) Appl. No.: 15/319,948

(22) PCT Filed: Jun. 23, 2015

(86) PCT No.: PCT/AU2015/050350
§ 371 (c)(1),
(2) Date: Dec. 19, 2016

(87) PCT Pub. No.: WO2015/196253
PCT Pub. Date: Dec. 30, 2015

(65) Prior Publication Data
US 2017/0138281 A1 May 18, 2017

(30) Foreign Application Priority Data
Jun. 27, 2014 (AU) .................. 2014902469

(51) Int. Cl.
*F02D 41/00* (2006.01)
*F02D 41/22* (2006.01)
(Continued)

(52) U.S. Cl.
CPC .......... *F02D 41/009* (2013.01); *B64C 39/024* (2013.01); *F02D 41/222* (2013.01);
(Continued)

(58) Field of Classification Search
CPC ................ F02D 41/009; F02D 41/222; F02D 2200/044; F02D 2400/08
(Continued)

(56) References Cited

U.S. PATENT DOCUMENTS

| 4,425,889 A | 1/1984 | Hachitani et al. |
| 4,782,692 A * | 11/1988 | Peden .................. G01M 15/06 |
| | | 73/114.25 |

(Continued)

FOREIGN PATENT DOCUMENTS

| DE | 10 2006 038 281 | 2/2008 |
| JP | 2009-250181 | 10/2009 |

(Continued)

OTHER PUBLICATIONS

International Search Report issued in corresponding International Application No. PCT/AU2015/050350 dated Jul. 17, 2015.

(Continued)

*Primary Examiner* — Thomas Moulis
(74) *Attorney, Agent, or Firm* — Hogan Lovells US LLP

(57) ABSTRACT

Redundancy in engine timing position sensing maintains a UAV operational in the event of failure of a primary engine timing position sub-system. The redundancy avoids duplication of the primary crankshaft timing position sensing components, and avoids adding weight, cost and component complexity. Conditioned (square) waveform(s) (102) is/are created from respective sinusoidal waveform(s). Each consecutive leading edge (103*a*) and trailing edge (103*b*) of the pulses of the square waveform (102) is derived from the crossing of the zero voltage value by consecutive sinusoidal waveforms A,B,C (e.g. Voltage (V) vs Time (t) or angular degrees). The square pulse waveform (102) is output (104) to a microcontroller (106) to create and output a pseudo crankshaft timing position signal (108) to be used by an
(Continued)

ECU to determine ignition and fuel injection events in the event that the primary timing signal from the crankshaft position sensor (CPS) has failed. The signal (108) output to the ECU can have a missing pulse (116) (i.e. indicative of a TDC position of the engine crankshaft) as well as multiple square pulses (114) corresponding to the pulses of the initial square pulse waveform (102). The waveform signal (108) is therefore derived from the alternator waveform signal(s) and provides a pseudo crankshaft timing position signal in the event of failure of the primary or initial CPS signal.

32 Claims, 2 Drawing Sheets

(51) Int. Cl.
*H02K 11/21* (2016.01)
*B64C 39/02* (2006.01)

(52) U.S. Cl.
CPC .......... *H02K 11/21* (2016.01); *B64C 2201/00* (2013.01); *B64C 2201/044* (2013.01); *F02D 2200/101* (2013.01); *F02D 2400/08* (2013.01); *Y02T 10/40* (2013.01)

(58) Field of Classification Search
USPC .................................................... 123/406.18
See application file for complete search history.

(56) References Cited

U.S. PATENT DOCUMENTS

| | | | | |
|---|---|---|---|---|
| 5,060,614 | A | 10/1991 | Uchimi et al. | |
| 5,263,450 | A * | 11/1993 | Hashimoto | F02D 41/009 123/406.62 |
| 5,604,304 | A * | 2/1997 | Kokubo | F02D 41/009 701/101 |
| 5,671,714 | A * | 9/1997 | Fukui | F02D 41/009 123/406.62 |
| 5,952,586 | A * | 9/1999 | Matui | G01L 3/1414 73/862.194 |
| 6,675,772 | B1 * | 1/2004 | Mingo | F02D 41/009 123/406.18 |
| 7,621,176 | B2 | 11/2009 | Layher et al. | |
| 7,974,767 | B2 | 7/2011 | Maier et al. | |
| 8,100,000 | B1 * | 1/2012 | Rankin | G01D 5/2457 73/114.03 |
| 9,673,669 | B2 * | 6/2017 | Yamada | H02K 21/16 |
| 9,728,014 | B2 * | 8/2017 | Khalaschi | G07C 5/0808 |
| 9,777,696 | B2 * | 10/2017 | Schremmer | F02P 9/007 |
| 2002/0078925 | A1 | 6/2002 | Kobayashi | F02D 41/009 123/406.18 |
| 2007/0256482 | A1 * | 11/2007 | Sheikh | G01M 15/06 73/114.26 |
| 2008/0053407 | A1 | 3/2008 | Maier et al. | |
| 2010/0043750 | A1 | 2/2010 | Lysinger | |
| 2010/0206266 | A1 * | 8/2010 | Tsunooka | F02D 31/003 123/339.18 |
| 2010/0235015 | A1 * | 9/2010 | Chang | H04L 12/40013 701/1 |
| 2013/0009403 | A1 * | 1/2013 | Cornelius | F03D 9/00 290/55 |
| 2013/0138322 | A1 * | 5/2013 | Genevrier | F02D 45/00 701/100 |

FOREIGN PATENT DOCUMENTS

| | | |
|---|---|---|
| NO | 2009/006712 | 1/2009 |
| NO | 2013/000035 | 1/2013 |
| WO | 2009/006712 | 1/2009 |
| WO | 2013/000035 | 1/2013 |

OTHER PUBLICATIONS

International Preliminary Report and annexes issued in corresponding International Application No. PCT/AU2015/050350 dated May 11, 2016.
Supplemental European Search Report for EP Application No. 15 81 2348 dated Jan. 11, 2018.
Reply to Search Opinion/Written Opinion/IPER for EP Application No. 15 81 2348 filed Jun. 30, 2017.

* cited by examiner

REDUNDANCY IN UAV ENGINE TIMING POSITION SYSTEMS

CROSS REFERENCE TO RELATED APPLICATIONS

This application is a 35 U.S.C. 371 National Stage of International Application No. PCT/AU2015/050350, titled "REDUNDANCY IN UAV ENGINE TIMING POSITION SYSTEMS" filed on Jun. 23, 2015, which claims priority to Australian Application No. 2014902469, titled "REDUNDANCY IN UAV ENGINE TIMING POSITION SYSTEMS", filed on Jun. 27, 2014, all of which are incorporated by reference herein in their entirety.

FIELD OF THE INVENTION

The present invention relates to control of engines used in unmanned aerial vehicles.

The present invention is particularly applicable to redundancy in engine timing position determination for operation of UAV engines.

BACKGROUND TO THE INVENTION

Unmanned aerial vehicles (UAVs) require range and durability in the air. To help achieve this, engines and their control systems for such UAVs need to be relatively light in weight and yet provide high performance.

One way to achieve lightness in weight is to omit as many non-essential components and control system parts as possible and/or to make such components lightweight. However, to survive in the extreme ambient conditions that UAVs are exposed to, the engine and its control systems also need to be robust and reliable.

Engine timing position sensing is an essential part of engine control. Without sensing of the rotational position of the crankshaft, camshaft or related rotational components, the UAV engine will either not start or will not continue to run.

In modern engines, rotational position of the crankshaft or camshaft is typically sensed by a fixed position Hall Effect, inductive or optical sensor detecting a timing indicator on a rotary member attached to the crankshaft or camshaft.

The crankshaft and/or camshaft position sensor arrangement is used to monitor the relationship between the pistons and various cylinder ports of the engine (i.e. for a two stroke engine configuration) or the relationship between the pistons and valves in the engine (i.e. for a four stroke engine configuration). The signals from the sensor are used to synchronise the timing of such pistons, valves and injection of fuel into the combustion chamber(s) and the ignition thereof. Crankshaft/camshaft rotational position sensing is also commonly used as the primary source for the measurement of engine speed in revolutions per minute.

Common mounting locations for the position indicator include the main crank pulley, the flywheel, the camshaft or on the crankshaft itself.

The crankshaft or camshaft timing position sensor is a vitally important sensor in modern day engines. When it fails, the engine will not start or will cut out while running.

Typically the position sensor arrangement includes a rotary encoder, having a disc or a toothed wheel or other notched indicator rotating in fixed relationship with the crankshaft or camshaft. A sensor detects one or more marks/teeth/notches and the signal generated is used to provide an accurate indication of the rotational position of the crankshaft/camshaft (and therefore of the connected pistons) for engine injection, ignition and combustion timing purposes.

Whilst it may be desirable to omit components and control system parts to provide weight benefits in certain engines, minimising components in engine systems, particularly where this may impact on any redundancy capability, can however lead to an increased risk of engine failure, and ultimately potentially complete loss of the UAV.

UAVs need to be reliable because the consequences of mechanical or electrical failure (such as engine mechanical failure or engine sub-system failure e.g. the engine timing system) can be very severe. If a UAV in some way fails whilst flying, this can result in the ultimate demise and destruction of the UAV when it falls back down to the ground.

Also, such failure can happen when the UAV is a long way from its base and potentially over dangerous or difficult terrain, making safe recovery risky or impossible. There is also the associated risk of losing very expensive surveillance or other equipment carried by the UAV.

The need for reliability becomes particularly crucial if UAVs are used in civilian areas where a failure could endanger human lives and personal property.

To maintain reliability, additional and/or more robust components can be used. However, this tends to lead directly to increased UAV weight and also additional unit and replacement costs.

Robustness of components tends to require more material or features in order for the components to better withstand shock, vibration, extremes of temperature and changes in temperature. This need for robustness of components is all the more relevant for UAVs which need to cope with harsh environmental conditions experienced at high altitude for long periods of time.

Furthermore in terms of reliability, having only one system on-board does not allow for any failure at all of the engine timing system. This may also not satisfy certain regulatory requirements for such aerial vehicles when used in specific applications.

It would hence be beneficial to have full redundancy in the engine timing system for UAV engines. This could obviously be achieved by exactly duplicating primary engine timing components, such as providing a second rotary encoder and sensor arrangement.

A benefit of such duplication of the primary engine timing system is that components are exactly the same between the two systems, making spare parts and maintenance easier to manage.

Furthermore, replicating the primary engine timing system with an entire range of the same engine timing components will enable full performance of the UAV to be maintained in order to complete a flight without returning to point of origin.

However, merely duplicating the primary engine timing system can significantly impact desired weight and space constraints of the UAV which can in turn reduce performance and range of the UAV. Such duplication can also result in an increase of the overall cost of UAV.

For example, for engines utilising a rotary encoder having a toothed/notched timing indicator wheel on an end of the crankshaft and a fixed sensor (such as a magnetic or optical sensor) to detect when a timing indicator on the wheel passes the sensor, adding a second such timing indicator wheel and sensor arrangement (or at the very least a second sensor detecting the timing indicator on the first wheel and having electronics to compensate for the different rotational position of the timing indicator) would add significant complexity and weight to the UAV.

Also, duplicating the primary engine timing system components invariably adds to the cost of the UAV engine systems, not least because the primary engine timing system components needing to be robust are therefore relatively expensive.

Whilst it would be beneficial to have full engine timing system redundancy with two matching (duplicated) engine timing systems for UAV engines, the added weight and space of the complete second system would be too detrimental to performance and the effect on cost would also be an issue. That is, an engine timing system along these lines which includes full duplicated standard engine timing systems, one serving as a primary system, and one for backup/redundancy purposes, would make for an uncompetitive overall engine package.

The need to provide for redundancy of key engine components and control systems is however required by civil aviation authorities for many aircraft systems.

As discussed above, the mere duplication of parts to provide such redundancy capability in such UAV aircraft systems is in conflict with the requirement to keep weight to a minimum. Accordingly, an engine timing system which can provide partial redundancy operation is proposed, which fulfils the need for operational redundancy without incurring a significant weight (and cost) penalty incurred by such direct duplication.

Systems have previously been proposed that provide a backup for failure of timing position sensing or other absence of a timing position signal for an engine. However, these typically require either duplication of components to provide redundancy, or have additional components that are used to emulate a timing signal or help derive a timing signal. Such systems do not provide for partial redundancy of an engine timing system which fulfils the need for operational redundancy without incurring a significant weight (and cost) penalty incurred by direct duplication of timing system components or adding other components that are used to emulate or replace components in order to generate a replacement timing signal, and thus add significantly to weight and cost.

US 2007/0256482 discloses a system which alleviates electromagnetic disturbances when a 'bumpless' crankshaft positioning system of a railway locomotive engine switches over from a failed crankshaft position sensor to a backup crankshaft position sensor. A second crankshaft position signal stream is generated to compensate for any missing or false crankshaft position signals (e.g. when a toothed crankshaft timing wheel has a missing tooth). That is, the second crankshaft position signal stream emulates the first crankshaft position signal stream. To achieve this, the system of US 2007/0256482 either generates a virtual second crankshaft position signal stream from the first crankshaft position signal stream during a window of operation, or uses a second crankshaft position sensor to generate the second crankshaft position signal stream. Thus, US 2007/0256482 adds a second crankshaft position sensor and associated connections and processing to generate the emulated second crankshaft position signal stream, which adds weight and cost to the engine/vehicle.

U.S. Pat. No. 4,782,692 discloses determining simulated crankshaft angle signals by calculating the engine speed based on the elapsed time between two consecutive piston top dead centre positions of the crankshaft as sensed by a 'top dead centre' (TDC) crankshaft sensor mounted in an engine driven solenoid fuel pump. Based on the calculated engine speed, a program uses a lookup table or an algorithm to obtain a value representing the increment of time required for the crankshaft to rotate through a predetermined crankshaft angle. This value replaces a failed or missing crankshaft position sensor value. Accordingly, U.S. Pat. No. 4,782,692 requires not only the crankshaft position sensor but also the TDC sensor. As described hereinafter, the present invention proposes at least one entirely different methodology, system and solution to the problem of generating a backup timing signal, U.S. Pat. No. 5,060,614 discloses a reference position sensor and an angle position sensor on the crankshaft of an engine. The reference position sensor provides an indication of cylinder position each revolution. The angle position sensor provides an indication of crankshaft angle. A cylinder discriminating sensor is provided on a camshaft. When each cylinder reaches a particular position, and the crankshaft is at a particular angle, a narrow pulse is produced, and when the reference cylinder reaches a particular piston position, a wide pulse is produced. A CPU uses all three sensor values to determine ignition timing. As a backup, when the cylinder discriminating sensor is abnormal, the reference cylinder signal can be produced based on the output of the reference position sensor. Therefore, U.S. Pat. No. 5,060,614 requires multiple position sensors to cater for redundancy in any one of them. This clearly adds cost and weight to the engine. The present invention avoids the significant weight (and cost) penalty incurred by duplicating sensors or having multiple sensors providing backup for each other.

JP 2009-250181 discloses a backup arrangement to deal with failure of a rotary encoder. The rotary encoder is arranged on a crankshaft. An auxiliary timing signal generator is provided to generate an auxiliary timing signal of a fixed frequency. If the rotary encoder fails, rotation angle of the crankshaft is determined as one pulse of the auxiliary timing signal based on a reference signal. JP 2009250181 requires the auxiliary timing signal generator to provide a backup timing signal as a redundancy measure. The present invention avoids such additional weight and cost whilst providing partial redundancy operation to fulfil the need for operational redundancy.

U.S. Pat. No. 7,621,176 discloses determining an absolute crankshaft angle of a power tool. A pressure sensor detects an operating pressure in the engine. An output of the pressure sensor and of a signal generator are linked together to determine the absolute crankshaft angle.

U.S. Pat. No. 7,974,767 discloses selecting a period duration of a voltage signal to correspond with the n-th portion of a crankshaft revolution. The n-th portion provides a crankshaft angle interval. For each crankshaft angle interval at least one detail is detected which represents a course plotted against the crankshaft angle. The course is scanned with regard to characteristic features that are correlated with an operating parameter of the power tool.

U.S. Pat. No. 7,974,767 seeks to determine operating parameters of an engine of a power tool. For example, the load on the tool, the operating state of a heater, the operating state of a valve, the wear state of the tool, crankshaft position, throttle position and fuel mixture, can be determined without sensors. In essence, U.S. Pat. No. 7,974,767 identifies the signal of an alternating voltage in order to derive therefrom an operating characteristic of the power tool, such as identifying a load signature or faulty component leading to an irregular or unexpected signal.

With the aforementioned in mind, it is desirable for the present, invention to provide engine timing system redundancy for a UAV that provides such redundancy capability but alleviates the problem of adding significantly to the weight and cost of the UAV.

SUMMARY OF THE INVENTION

The present invention provides in one aspect a method of providing engine timing position signal redundancy for an engine of an unmanned aerial vehicle (UAV) having primary timing position determining means for providing a crankshaft or camshaft derived primary timing position signal for use in timing ignition and/or fuel injection events of the UAV engine, and secondary timing position determining means for providing a secondary timing position signal for timing the ignition and/or fuel injection events of the UAV engine in absence of the primary timing position signal, the method including; the secondary timing position signal determining means generating the secondary timing position signal from an alternator derived electrical signal in place of the crankshaft or camshaft derived primary timing position signal.

The secondary timing position signal is then available for use in determining engine ignition and fuel injection event timing events to maintain the UAV engine operating, such as in the event of failure of the primary timing position determining means.

It is advantageous and highly beneficial that the present invention provides a redundant timing system which is also light-weight, by avoiding having to add further ignition timing components, unlike systems described in the background section above. The present invention is highly advantageous for UAV specific applications where weight is at a premium (reducing weight helps to increase engine operating time through reduced fuel consumption and/or helps to increase airspeed).

Preferably the primary timing position determining means includes a crankshaft timing position sensor arrangement, such as a Hall Effect, inductive or optical crankshaft timing position sensor.

Thus, the UAV engine incorporates redundancy in the timing position determining system through an electrically derived timing position value without the need to add the weight and space taken up by a second crankshaft timing position sensor (CPS) or a camshaft timing position sensor arrangement and associated components.

The alternator may preferably be directly coupled to the crankshaft, preferably through a 1:1 drive or a fixed ratio thereof.

Preferably the alternator derived secondary timing position signal serves as a back-up to a primary timing position sensor signal generated by the primary timing position determining means for redundancy requirements should the primary timing position signal fail, such as through failure of a crankshaft rotary encoder or the fixed crankshaft position sensor.

Preferably, the secondary timing position determining means provides a secondary timing signal for a 'limp-home' mode of operation without adding considerable weight disadvantage yet enabling the UAV to return to base or at least land safely, and thereby avoid complete loss or damage of the UAV.

The primary timing position determining means may provide a signal for use as a synchronisation signal by the secondary timing position determining means. For example, at engine start-up, with the primary engine timing position determining means operative and providing an initial primary timing position signal, the secondary timing position determining means can synchronise engine timing from that initial signal to determine correct crankshaft timing position and thereafter provide an equivalent of the crankshaft timing position signal even in the subsequent event of failure or loss of the primary timing position signal (e.g. if the crankshaft timing position sensor fails).

Crankshaft position sensing is typically based on a Top Dead Centre (TDC) position, relating to the highest point the piston(s) reach in their stroke within the respective cylinder (s). At that highest point, TDC is deemed to be 0 degrees. Ignition and fuel injection event timings are based on, usually a number of degrees in advance of, TDC.

The secondary timing position signal may be generated by or from a processor which conducts signal conditioning on signals obtained from voltage(s) generated by the alternator.

An electronic engine management system of the engine may use the secondary timing position signal to substitute for the primary timing position signal in the event of failure of the primary timing position signal determining means.

The secondary timing position signal may be derived from at least one zero value of a waveform generated by the alternator when in operation.

Preferably the alternator may be a single phase alternator and at least one zero value is derived from a zero voltage value of the generated voltage waveform.

Alternatively, the alternator may be a multi phase alternator (e.g. a three phase alternator) and at least one zero value is derived from a zero voltage value of at least one of multiple generated voltage waveforms.

The secondary timing position signal may be generated as an electrical signal derived from a number of zero voltage values generated by the alternator.

Preferably, the electrical signal may be generated having a signal leading edge derived from the zero voltage value of a voltage waveform and a signal trailing edge derived from a subsequent zero voltage value of the same waveform.

The electrical signal may, however, be generated having a signal leading edge derived from the zero voltage value of a voltage waveform and a signal trailing edge derived from the zero voltage value of another voltage waveform, such as will subsequently be described with reference to FIG. 2.

The electrical signal leading edge may be obtained or generated from an increasing voltage and the electrical signal trailing edge may be obtained or generated from a decreasing said voltage.

The secondary timing position signal may be synchronised with the primary timing position signal, such as at engine start-up or during operation of the engine when the primary timing position signal determining means is operative. Subsequent re-synchronisation may be conducted periodically or as required.

A synchronisation signal may therefore be provided to the secondary timing position signal determining means. For example, the primary timing position determining means may provide the synchronisation signal for use in generating the secondary timing position signal.

The synchronisation signal may be obtained from a primary crankshaft position sensor (CPS). Furthermore, when the synchronisation signal has been obtained from the primary CPS, the synchronisation signal may preferably no longer be required while the engine is running.

Synchronisation and/or re-synchronisation may be conducted by an engine management system (such as an ECU or microcontroller) of the engine.

The secondary timing position determining means may alternatively also derive the secondary timing position signal from engine speed fluctuations to determine crankshaft position, such as a value for TDC.

Preferably, the rotational speed of the engine is derived from or relates to rotational speed of a crankshaft or camshaft of the engine.

Change in rotational speed of the engine may be derived from rotational deceleration and acceleration of a crankshaft or camshaft of the engine.

A value indicative of a top dead centre (TDC) timing position for the engine may be obtained from considering the deceleration and acceleration in the rotational speed of the engine crankshaft or camshaft.

The value indicative of TDC may be derived from voltage frequency variation generated by the alternator coupled to the crankshaft. The alternator may be directly coupled (1:1 drive ratio) or mechanically coupled through a drive means providing a fixed drive ratio (not necessarily 1:1).

The timing position value for TDC may also be approximated from a change from decreasing voltage frequency to increasing voltage frequency generated by the alternator.

A further aspect of the present invention provides an engine management system of a UAV engine, the system including primary engine timing position determining means providing a crankshaft or camshaft derived primary timing position signal for use in timing ignition and/or fuel injection events of the engine, and secondary engine timing position determining means for providing a secondary timing position signal for timing the ignition and/or fuel injection events of the UAV engine in absence of the primary timing position signal, the secondary engine timing position determining means providing an alternator output signal derived substitute engine timing position signal in the event of failure of the primary engine timing position determining means providing the primary engine timing position signal.

Preferably the secondary engine timing position determining means includes a processor receiving electrical signals derived from an alternator driven by the engine.

The processor may provide signal conditioning to relating to voltage generated from the alternator.

Preferably the processor forms part of an engine control unit (ECU), or is electrically connected to the ECU of the engine.

The processor may be provided as a stand alone unit electrically connected between the alternator and the engine's ECU (i.e. as a retrofit sub-system).

The primary timing position determining means may be arranged and configured to provide a synchronisation signal for use in generating the secondary timing position signal.

The primary timing position determining means may include a crankshaft position sensor (CPS).

DESCRIPTION OF PREFERRED EMBODIMENT

Figure 1:
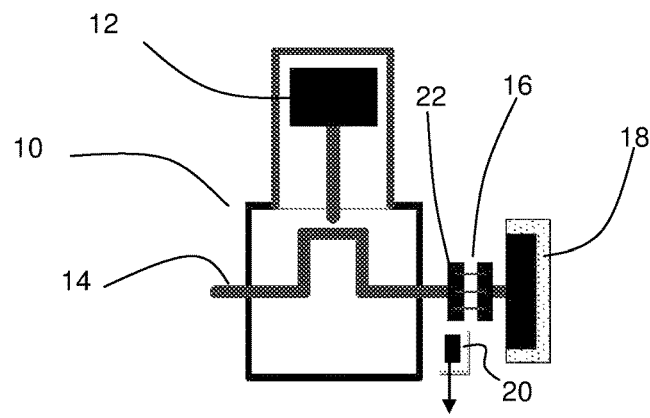
FIG. 1 shows a schematic representation of an engine with an alternator directly coupled to the crankshaft of the engine.

The present invention provides for redundancy in engine timing position sensing to maintain a UAV operational (at least in a 'limp home' mode of operation) in the event of failure of a primary engine timing position sub-system (such as failure of a crankshaft rotary encoder/sensor).

One or more forms of the present invention provides for such redundancy without requiring duplication of the primary crankshaft timing position sensing components, and thereby avoids adding weight, cost and component complexity.

Avoiding additional weight within a UAV is very important as it means that range and/or duration (such as loitering time) can be increased, providing a substantial advantage for the UAV operator. Any advantage in keeping overall weight down means that the UAV uses less fuel to take-off and/or uses less fuel when cruising or loitering (which lead to greater duration in time and/or distance covered compared with a heavier vehicle). Alternatively, for a lower vehicle weight, a lower powered and/or smaller sized engine can be utilised, which can make the UAV 'package' smaller and more discrete in the air.

It will be appreciated that rotation of the rotor of the alternator of a UAV engine results in magnets rotating past the stator poles of the alternator. This action causes fluctuating voltages to be generated in a sinusoidal pattern as is known for typical alternator arrangements.

The wavelength of the sinusoidal waveform(s) produced by the alternator corresponds exactly with one revolution of the engine/crankshaft. Thus, voltage signals produced by the alternator can be correlated to angular degrees of rotation of the crankshaft and therefore related to crankshaft position and hence the timing of various engine events.

For a single phase alternator, only one sinusoidal waveform is generated. For a multi phase alternator, multiple separate sinusoidal waveforms will be generated, one for each phase. The sinusoidal waveform (single or each of the multiple waveforms) has a peak positive voltage, a peak negative voltage and a point where the voltage crosses zero.

The present invention uniquely utilises the signal(s) from the phase(s) of the alternator to generate a secondary engine timing signal.

TDC synchronisation according to one or more embodiments of the present invention can be derived from one or both of two sources.

According to at least one embodiment of the present invention, an electronic circuit is arranged to detect each time the voltage from the alternator crosses zero. Since the position of the magnets and the poles of the alternator are fixed in relation to the engine crankshaft (the alternator having a fixed drive ratio with respect to the crankshaft), the engine crankshaft timing position can be derived from the sinusoidal waveform(s) from which a value for Top Dead Centre (TDC) synchronisation can then be determined.

The first TDC synchronisation source is a synchronisation pulse obtained from the primary crankshaft position sensor (CPS) when the CPS is functional. Once this synchronisation pulse is obtained from the primary CPS, it is no longer required provided the engine does not stop (e.g. engine stall) or the crankshaft does not reverse rotate.

It is also possible to continuously re-synchronise with the primary CPS while the primary CPS signal is deemed to be valid. Hence if the primary CPS fails anytime after a successful engine start, this would not affect the functionality of embodiments of the present invention to generate the secondary CPS signal (i.e. providing redundancy to ensure the engine keeps working even when the primary CPS fails).

Therefore, using a combination of the zero crossings from sinusoidal waveform(s) generated by the alternator and an initialising synchronisation pulse generated by the primary CPS sensor, it is possible to re-generate a pseudo CPS signal that is synchronised to the position of the crankshaft. This signal can be provided to the engine controller (ECU) as a secondary (redundant) crankshaft position signal and used by the ECU in the event of a failure of the primary CPS signal.

The secondary timing position signal can be available in the background even while the primary CPS is operating normally. Thus, redundancy back-up is immediately available in the event of failure of the primary CPS.

The alternative (second) source for the synchronisation of the TDC position can be derived from processing the time between consecutive zero crossings of the alternator phase signal(s) (i.e. sinusoidal waveform(s)) to determine engine acceleration.

Since the crankshaft decelerates as the piston compresses the fuel/air mixture within the cylinder and then quickly accelerates as the mixture is ignited and expands, it is possible to detect the rapid change from deceleration to acceleration of the piston and therefore infer the engine TDC position.

FIG. 1 shows a schematic representation of an engine 10 having a piston 12 connected to a crankshaft 14. The crankshaft is coupled by a coupling 16 to an alternator 18. Only one cylinder/piston of the engine is shown, but it will be appreciated that the present invention is applicable to single and multi-cylinder engines.

A rotary encoder at the end of the crankshaft includes a crankshaft position sensor 20 for detecting an indicator 22 rotating on the end of the crankshaft 14 to provide a crankshaft timing position signal/pulse.

The sensor can be, for example, a Hall Effect sensor, an optical sensor or an induction sensor. The sensor 20 can detect the presence or absence of a timing marker rotating in unison with the end of the crankshaft, such as a notch or tooth/missing tooth on a wheel, or a marker on an encoder disc.

It will be further appreciated that the rotor of the alternator 18 rotates in fixed relationship with the crankshaft 14, whether directly driven (1:1 ratio) or through a different ratio.

A mechanical drive coupling between the crankshaft and the alternator, such as via gears, a sprocket and chain arrangement, or a toothed belt and toothed pulley arrangement is preferred in order to avoid the risk of slippage (such as through a loose drive belt) and loss of signal integrity or consistency of the alternator output. Such an arrangement helps to eliminate or reduce the risk of receiving an incorrect secondary timing signal.

Figure 2:
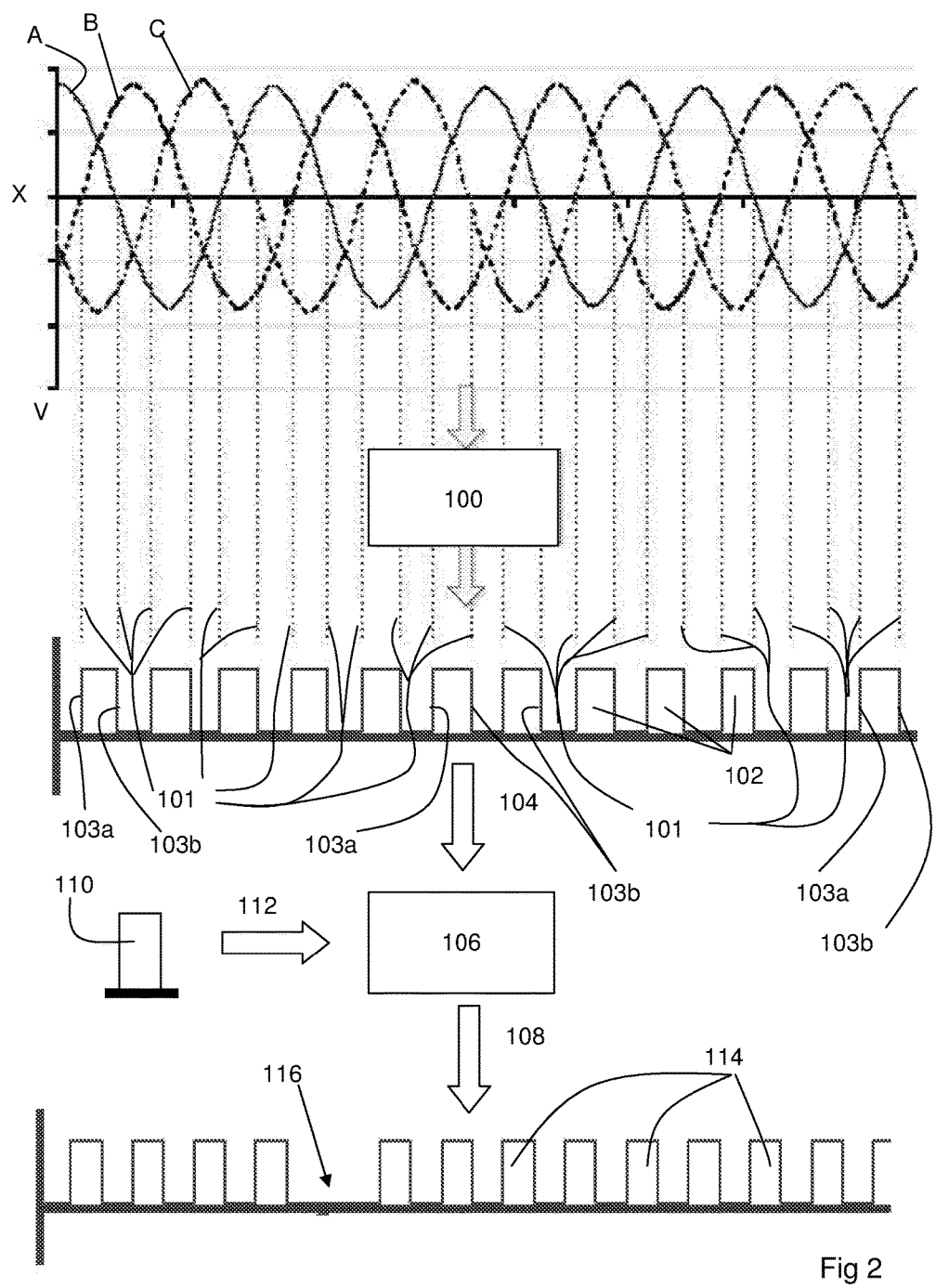
FIG. 2 shows a representation of crankshaft timing signal derivation from alternator voltage waveforms according to an embodiment of the present invention.

FIG. 2 shows three sinusoidal voltage waveforms A, B, C output from a three phase (i.e. a multi-phase) alternator. Each waveform is 120 degrees separated from the next. Each waveform crosses the zero voltage axis X.

Each crossing of the zero voltage axis by a waveform A, B or C is determined and processed by a processor 100, which, after the application of some signal conditioning, generates a square pulse waveform 102. That is, the square pulse waveform 102 is formed from crossings of the zero voltage axis X (i.e. zero voltage value) by each consecutive waveforms A, B and C (e.g. Voltage (V) vs Time (t) or angular degrees α).

The square pulse waveform 102 is thereby created with each consecutive leading edge 103a and corresponding trailing edge 103b of the pulses of the square waveform 102 derived from the crossing of the zero voltage value by consecutive sinusoidal waveforms A,B,C (e.g. Voltage (V) vs Time (t) or angular degrees, as shown by the vertical consecutive indicator lines 101 from left to right in FIG. 2.

The (conditioned) square pulse waveform 102 is output 104 to a microcontroller 106 to create and output 108 a pseudo crankshaft timing position signal to be used by an ECU (not shown) to determine ignition and fuel injection events in the event that the primary timing signal from the crankshaft position sensor (CPS) has failed.

When the microcontroller 106 processing the waveform 102 is independent of the ECU, an optional synchronisation pulse 110 can be provided at 112 from the ECU. This can correspond to an initial CPS signal from when the primary CPS was functioning (e.g. at engine start-up).

The resulting signal 108 which is output to the ECU can hence be modified to comprise a missing pulse 116 (i.e. indicative of a TDC position of the engine crankshaft) as well as multiple square pulses 114 which correspond to the pulses of the initial square pulse waveform 102. The waveform signal 108 is therefore derived from the alternator waveform signal(s) and provides a pseudo crankshaft timing position signal in the event of failure of the primary or initial CPS signal.

Figure 3A:
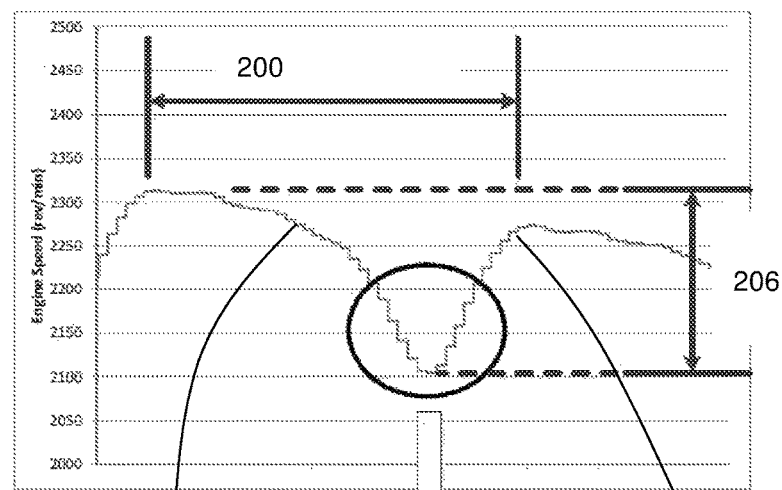
FIG. 3 shows a representation of use of engine deceleration and acceleration (change in engine speed) for deriving an equivalent to a crankshaft timing signal, according to a further embodiment of the present invention.
Figure 3B:
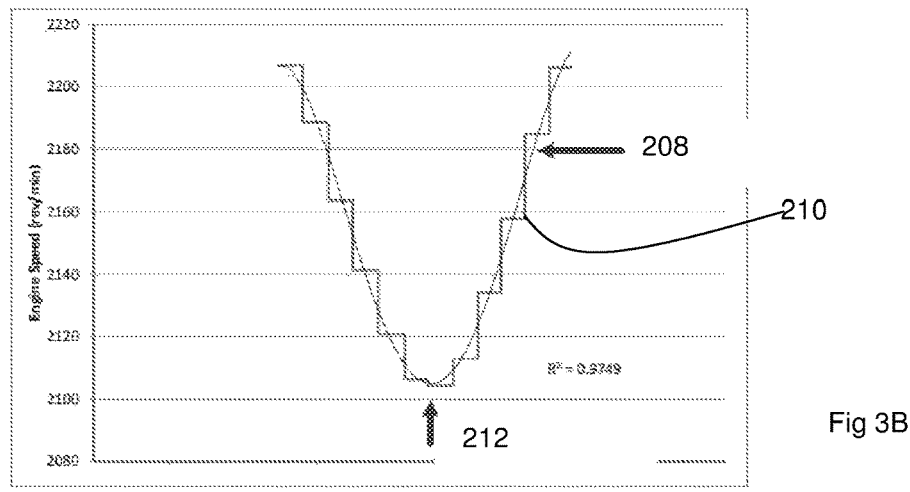

Alternatively, as shown in FIGS. 3A and 3B, a pseudo crankshaft timing position signal can be derived from a consideration of the change in speed of the engine crankshaft (i.e. as the piston(s) slow(s) down within the engine cylinder during compression and accelerates as a result of ignition and combustion of the fuel-air mixture).

This change from deceleration to acceleration of the crankshaft is used to determine or infer a crankshaft timing TDC position.

An algorithm can be employed to smooth out fluctuations in the obtained signal to generate a trend line and thereby better approximate the correct crankshaft timing position.

This pseudo crankshaft timing position signal can be input to the ECU and thereby provide a back-up (redundancy) timing signal in the event of failure of the primary crankshaft position sensor (CPS).

During a crankshaft rotation 200 as shown in FIG. 3A (e.g. in a four stroke engine—piston decelerating approaching TDC during compression and accelerating during combustion expansion towards Bottom Dead Centre BDC), the crankshaft trace shows a deceleration 202 in speed as the piston approaches TDC and a subsequent acceleration 204 during combustion after the piston has passed through the TDC position. This change in speed provides a variance range 206 in engine speed.

As shown in FIG. 3B, a smoother trend line 210 can be determined from the actual variable speed signal 208 initially obtained and hence enable accurate determination of a TDC point 212. This trend line 210 can be determined by the engine ECU when the variable speed signal 208 may not itself be sufficiently smooth to accurately infer the TDC point 212.

It will be appreciated that the engine speed/crankshaft speed can be determined from the frequency that the alternator waveform(s) cross(es) the zero voltage value.

Thus, as the crankshaft decelerates, the alternator zero voltage point crossings become more spaced in time (lower frequency). As the crankshaft speed accelerates, the alternator zero voltage point crossings become more frequent (higher frequency).

An assessment or determination of the inflection point at which deceleration changes to acceleration from this change in frequency can hence be used as the pseudo TDC value, sufficiently accurate for the UAV to at least continue operating in a 'limp home' mode of operation in the event of failure of the primary CPS system.

An alternator has a fixed number of zero voltage point crossings per cycle (e.g. a three phase alternator can have 42 zero voltage point crossings per cycle). Counting the number of crossings, and knowing the initial TDC (from the originally working primary CPS output), it is then possible to maintain a pseudo crankshaft timing position signal providing the count of the number of zero voltage point crossings is accurately maintained.

Alternatively, a TDC value can be inferred from variation in speed of the crankshaft and used as a pseudo crankshaft timing position speed signal based on an assessment of the deceleration-acceleration characteristics of the crankshaft, without the need for knowing the initial CPS TDC value or needing the alternator generated timing signal.

It will be appreciated that the present invention provides for redundancy in engine timing position sensing to maintain a UAV operational (at least in a 'limp home' mode of operation) in the event of failure of a primary engine timing position sub-system.

The present invention beneficially overcomes the significant weight increase (and also cost increases) that would otherwise come with a full redundancy system whereby the primary timing position sensing system is simply duplicated, whilst maintaining an operational 'back-up' or secondary timing position system at least sufficient to enable the UAV to return to base or to reach a safe location to avoid the potential complete loss of the UAV.

That claimed is:

1. A method of providing engine ignition position signal redundancy or fuel injection position signal redundancy for an engine of an unmanned aerial vehicle (UAV) having primary position determining means for providing a crankshaft or camshaft derived primary position signal for use in timing ignition events and/or timing fuel injection events of the UAV engine, and secondary position determining means for providing a secondary position signal for timing the ignition events and/or timing the fuel injection events of the UAV engine in absence of the primary position signal, the method including; the secondary position signal determining means generating the secondary position signal from an alternator derived electrical signal in place of said crankshaft or camshaft derived primary position signal.

2. The method of claim 1, whereby the secondary position signal is used by an electronic engine management system of the engine to substitute for the primary position signal in the event of a failure of the primary position signal determining means.

3. The method of claim 1, whereby the secondary position signal is derived from at least one zero value of a voltage waveform generated by the alternator when in operation.

4. The method of claim 3, whereby the alternator is a single phase alternator and at least one zero value is derived from a zero voltage value of the generated voltage waveform.

5. The method of claim 3, whereby the alternator is a multi phase alternator and at least one zero value is derived from a zero voltage value of at least one of multiple generated voltage waveforms.

6. The method of claim 3, including generating the secondary position signal as an electrical signal derived from a number of zero voltage values generated by the alternator.

7. The method of claim 4, whereby the electrical signal is generated having a signal leading edge derived from the zero voltage value of a said voltage waveform and a signal trailing edge derived from a subsequent zero voltage value of the same said waveform.

8. The method of claim 5, whereby the electrical signal is generated having a signal leading edge derived from the zero voltage value of a said voltage waveform and a signal trailing edge derived from the zero voltage value of another voltage waveform.

9. The method of claim 7, whereby the electrical signal leading edge derives from an increasing said voltage and the electrical signal trailing edge derives from a decreasing said voltage.

10. The method of claim 1, including synchronising the secondary position signal with the primary position signal.

11. The method of claim 1, including the primary position determining means providing a synchronisation signal for use in generating the secondary position signal.

12. The method of claim 11, further including obtaining the synchronisation signal from a primary crankshaft position sensor (CPS).

13. The method of claim 12, further including, when the synchronisation signal has been obtained from the primary CPS, no longer requiring the synchronisation signal while the engine is running.

14. The method of claim 1, further including generating the said secondary position signal from an indication of change of rotational speed of the engine.

15. The method of claim 14, whereby the change in rotational speed of the engine is derived from rotational deceleration and acceleration of a crankshaft or camshaft of the engine.

16. The method of claim 15, including deriving a value indicative of a top dead centre (TDC) position of the engine from the deceleration and acceleration in the rotational speed of the crankshaft or camshaft.

17. The method of claim 16, further including deriving the value indicative of TDC from voltage frequency variation generated by the alternator operatively coupled to and driven by the crankshaft.

18. The method of claim 17, whereby a timing position value for TDC is approximated from a change from decreasing voltage frequency to increasing voltage frequency generated by the alternator.

19. An engine management system for managing ignition position signal redundancy or fuel injection position signal redundancy for an engine of a UAV engine, the system including primary engine position determining means for providing a crankshaft or camshaft derived primary position signal for use in timing ignition events and/or timing fuel injection events of the engine, and secondary engine position determining means for providing a secondary position signal for timing the ignition events and/or timing the fuel injection events of the UAV engine in absence of the primary position signal, the secondary engine position determining means providing an alternator output signal derived substitute engine position signal in the event of failure of the primary engine timing position determining means to provide the primary engine position signal.

20. The system of claim 19, the secondary engine position determining means includes a processor receiving electrical signals derived from an alternator driven by the engine.

21. The system of claim 20, wherein the processor includes signal conditioning means process signals relating to voltage generated from the alternator.

22. The system of claim 20, wherein the processor forms part of an engine control unit (ECU) or being electrically connected to the ECU of the engine.

23. The system of claim 22, wherein the processor is provided as a stand alone unit electrically connected between the alternator and the engine's ECU.

24. The system of claim 19, including the primary position determining means is arranged and configured to provide a synchronisation signal for use in generating the secondary position signal.

25. The system of claim 24, the primary position determining means includes a crankshaft position sensor (CPS).

26. The method of claim 8, whereby the electrical signal leading edge derives from an increasing said voltage and the electrical signal trailing edge derives from a decreasing said voltage.

27. The method of claim 4, including generating the secondary position signal as an electrical signal derived from a number of zero voltage values generated by the alternator.

28. The method of claim 5, including generating the secondary position signal as an electrical signal derived from a number of zero voltage values generated by the alternator.

29. The method of claim 3, including the primary position determining means providing a synchronisation signal for use in generating the secondary position signal.

30. The method of claim 10, including the primary position determining means providing a synchronisation signal for use in generating the secondary position signal.

31. The method of claim 2, further including generating a said secondary position signal from an indication of change of rotational speed of the engine.

32. The method of claim 3, further including generating a said secondary position signal from an indication of change of rotational speed of the engine.

* * * * *